(12) United States Patent
Shih et al.

US011629213B2

(10) Patent No.: US 11,629,213 B2
(45) Date of Patent: Apr. 18, 2023

(54) GRAFT POLYMER AND COMPOSITE MATERIAL CONTAINING THE SAME

(71) Applicant: INDUSTRIAL TECHNOLOGY RESEARCH INSTITUTE, Hsinchu (TW)

(72) Inventors: Ting-Yu Shih, Taipei (TW); Chia-Chun Wang, Kaohsiung (TW); Lu-Chih Wang, New Taipei (TW); Yuan-Kun Yu, Yilan (TW); Shu-Fang Chiang, Hsinchu (TW); Yi-Ting Hsieh, Zhudong Township (TW); Yu-Chun Liu, Taichung (TW); Jing-Wen Tang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 229 days.

(21) Appl. No.: 17/133,872

(22) Filed: Dec. 24, 2020

(65) Prior Publication Data

US 2021/0198409 A1     Jul. 1, 2021

Related U.S. Application Data

(60) Provisional application No. 62/953,648, filed on Dec. 26, 2019.

(51) Int. Cl.
*C08F 285/00* (2006.01)
*C08F 283/06* (2006.01)

(52) U.S. Cl.
CPC ........ *C08F 285/00* (2013.01); *C08F 283/065* (2013.01)

(58) Field of Classification Search
CPC .................................................. C08G 81/00
See application file for complete search history.

(56) References Cited

U.S. PATENT DOCUMENTS

| | | | |
|---|---|---|---|
| 6,596,267 B1 | 7/2003 | Hubbell et al. | |
| 8,198,364 B2 | 6/2012 | Zhu et al. | |
| 9,737,607 B2 | 8/2017 | Chen et al. | |
| 2012/0027941 A1 | 2/2012 | Fonseca et al. | |
| 2014/0186415 A1 | 7/2014 | Shih et al. | |
| 2015/0118322 A1* | 4/2015 | Lo ...................... | A61K 31/7036 514/777 |

FOREIGN PATENT DOCUMENTS

| | | |
|---|---|---|
| CN | 101331173 A | 12/2008 |
| CN | 103159958 A | 6/2013 |
| CN | 103893813 A | 7/2014 |
| CN | 104548109 A | 4/2015 |
| CN | 104562126 A | 4/2015 |
| EP | 3 037 458 B1 | 12/2017 |
| TW | I487543 B | 6/2015 |
| TW | I525110 B | 3/2016 |
| TW | I478943 B | 4/2016 |

OTHER PUBLICATIONS

Taiwanese Office Action and Search Report for Taiwanese Application No. 109145993, dated Aug. 19, 2021.
Chavan et al., "Formulation, solid state characterization and enhancement of dissolution rate of olmesartan medoxomil by polyvinyl alcohol-polyethylene glycol graft copolymer based nanoparicles", Indian Journal of Pharmaceutical Education and Research, vol. 50, Issue 4, 2016, pp. 678-688.
Dashevsky et ai., "Effect of water-soluble polymers on the physical stability of aqueous polymeric dispersions and their implications on the drug release from coated pellets", Drug Development and Industrial Pharmacy, vol. 36, No. 2, 2010, pp. 152-160.
Elaita et al., "On-demand manufacturing of immediate release leveliracetam tablets using pressure-assisted microsyringe printing", European Journal of Pharmaceutics and Biopharmaceutics, vol. 134, 2016, 1-25.
Goyanes et ai., "PET/CT imaging of 3D printed devices in the gastrointestinal tract of rodents", Elsevier, International Journal of Pharmaceutics, vol. 536, 2018. pp. 158-164.
Guo et al., "Nanomicelle formulation for topical delivery of cyclosporine A info ths cornea: in vitro mechanism and in vivo permeation evaluation", Scientific Reports. vol. 5, Article No. 12968, 2015, pp. 1-14.
Jeurissen et ai., "Polyvinyl alcohol (PVA)—polyethylene glycol (PEG) graft copolymer", Safety evaluation of certain food additives and contaminants, World Health Organization, Who Food Additives Series, 71, 2016, pp. 88-106.
Klukkert et al., "Rapid assessment of tablet film coating quality by multispectral UV imaging", AAPS Pharmaceutical SciTech, vol. 17, Oct. 13, 2015, pp. 958-967.
Liu et al., "Release behavior of tanshinone IIA sustained-release pellets based on crack formation theory", Journal Pharmaceutical Science, vol. 101, No. 8, Aug. 2012, pp. 2811-2620.
Luo et al., "Preparation, characterization, and applicalion of poly-(vinyl alcohol)-graft-poly(ethylene glycol) resins: novel polymer matrices for solid-chase synthesis", Journal of Combinatorial Chemistry, vol. 9, No. 4, 2007, pp. 582-591.
Melocchi et al., "Evaluation of hot-melt extrusion and injection molding for continuous manufacturing of immediate-release tablets", Research Article—Pharmaceutics, Drug Delivery arid Pharmaceutical Technology, vol. 104, No. 6, 2015, pp. 1-10.

(Continued)

*Primary Examiner* — Jeffrey C Mullis
(74) *Attorney, Agent, or Firm* — Birch, Stewart, Kolasch & Birch, LLP

(57) ABSTRACT

A graft polymer is provided, which includes a polymer backbone with a plurality of hydroxy groups, protection group modified histidine grafted onto the side of the polymer backbone, and hydrophilic polymer having terminal reactive group grafted onto the side of the polymer backbone. The graft polymer coating can be applied to metal material to form a composite material, which can be implanted into an organism to reduce adhesion problems.

9 Claims, 8 Drawing Sheets

(56) References Cited

OTHER PUBLICATIONS

Muschert et al., "Drug release mechanisms from ethylcellulose: PVA-PEG graft copolymer-coated pellets", Elsevier, European Journal of Pharmacestics and Biopharmaceutics, vol. 72, Issue 1, May 2009, pp. 133-137.
Petry et al., "Solid state properties and drug release behavior of co-amorphous indomethacin-arginine tablets coated with Kollicoat® Protect", Elsevier, European Journal of Pharmaceutics and Biopharmaceutics, vol. 113, Oct. 2017, pp. 150-160.
Williams et al., "Polyethylene glycol-polyvinyl alcohol graft copolymer: a peroxide-free binder", American Pharmaceutical Review, Nov. 38, 2815, 13 pages total.
Xu et al., "Formulation and in vitro characterization of novel sildenafil citrate-loaded polyvinyl alcohol-polyethylene glycol graft copolymer-based orally dissolving films", Elsevier, International Journal of Pharmaceutics, vol. 473, 2014, pp. 398-406.

* cited by examiner

GRAFT POLYMER AND COMPOSITE MATERIAL CONTAINING THE SAME

CROSS REFERENCE TO RELATED APPLICATIONS

This application claims the benefit of U.S. Provisional Application No. 62/953,648 filed on Dec. 26, 2019, the entirety of which is/are incorporated by reference herein.

TECHNICAL FIELD

The technical field relates to a graft polymer, and in particular it relates to a composite material formed by coating a metal material by the graft polymer and the method of utilizing the composite material.

BACKGROUND

According to statistics, 30 million or more patients worldwide are currently suffering from severe lower back pain. Moreover, it is expected that the number of related patients will inevitably increase due to entering an aging society. As reported by Global Market Insights, with regard to the neuroelectric stimulation equipment, the market value of related products in 2017 was about 4 billion US dollars, and it is estimated to grow to 13 billion US dollars by 2023. Among the related products, the implantable spinal cord stimulation (SCS) has the greatest market potential, and its value is estimated to grow rapidly to over 9 billion US dollars in 2023.

At present, implantable SCS has good effects in the clinical treatment of diseases such as Parkinson's disease, epilepsy, pain, obsessive-compulsive disorder and other diseases. However, this type of therapy requires that a neurostimulator electrode be implanted into the human body. After being in contact with blood and body fluids for several days, the electrode resistance is often increased due to protein deposition and adhesion, thereby lowering the effect of pain relief Although the mentioned condition can be improved by removing the electrode adhering protein and then implanting a new electrode under the skin, this is not an ideal method because this method not only consumes medical costs but also causes the patient to suffer.

Furthermore, in terms of the current treatment technology for preventing adhesion on the surface of medical products, commercial coatings mostly use surface hydrophilic molecules (e.g. PEG/PVP), and the substrates to be treated are mostly polymer consumables rather than metals. Moreover, surface treatment (such as plasma, ozone, corona, etc.) of the metal electrode of a complex shape can easily result in issues such as non-uniform thickness and high cost.

Therefore, research into modifying the implantable electrode surface so that it is anti-adhesive is called for.

SUMMARY

One embodiment of the disclosure provides a graft polymer, including a polymer backbone with a plurality of hydroxy groups; a protection group modified histidine grafted onto the side of the polymer backbone; and a hydrophilic polymer having a terminal reactive group grafted onto the side of the polymer backbone.

In some embodiments, the polymer backbone includes polyvinyl alcohol (PVA), polyalkylene glycol (PAG), polyvinyl acetate (PVAc), ethylene vinyl acetate copolymer (EVA), ethylene vinyl alcohol copolymer (EVOH), hyaluronic acid (HA), starch, cellulose, methyl cellulose (MC), hydroxypropyl methyl cellulose (HPMC), oxycellulose, glucan, scleroglucan polysaccharide, chitin, chitosan, curdlan gum, algin, carrageenan, pectin, arabic gum, guar gum, gellan gum, pullulan, chondroitin, heparin, or keratin sulfate.

In some embodiments, the polymer backbone has a molecular weight of 500 to 200000.

In some embodiments, the hydrophilic polymer of the hydrophilic polymer having the terminal reactive group includes methoxypolyalkylene glycol.

In some embodiments, the terminal reactive group of the hydrophilic polymer having the terminal reactive group includes isocyanate group, carboxyl group, acyl halide group, or epoxy group.

In some embodiments, the hydrophilic polymer having the terminal reactive group has a weight average molecular weight of 500 to 20000.

In some embodiments, the protection group of the protection group modified histidine includes tert-butoxycarbonyl (Boc), carbobenzoxy (Cbz), fluorenylmethyloxycarbonyl (Fmoc), or acetyl group.

In some embodiments, the polymer backbone and the protection group modified histidine have a weight ratio of 100:0.05 to 100:350, and the polymer backbone and the hydrophilic polymer having the terminal reactive group have a weight ratio of 100:0.1 to 100:1050.

One embodiment of the disclosure provides a composite material, including a metal material; and a graft polymer coating the metal material, wherein the graft polymer includes: a polymer backbone with a plurality of hydroxy groups; a protection group modified histidine grafted onto the side of the polymer backbone; and a hydrophilic polymer having a terminal reactive group grafted onto the side of the polymer backbone, wherein the graft polymer is adsorbed to the surface of the metal material by the protection group modified histidine.

In some embodiments, the metal material includes platinum, gold, iridium, palladium, or an alloy thereof.

In some embodiments, the polymer backbone includes polyvinyl alcohol (PVA), polyalkylene glycol (PAG), polyvinyl acetate (PVAc), ethylene vinyl acetate copolymer (EVA), ethylene vinyl alcohol copolymer (EVOH), hyaluronic acid (HA), starch, cellulose, methyl cellulose (MC), hydroxypropyl methyl cellulose (HPMC), oxycellulose, glucan, scleroglucan polysaccharide, chitin, chitosan, curdlan gum, algin, carrageenan, pectin, arabic gum, guar gum, gellan gum, pullulan, chondroitin, heparin, or keratin sulfate.

In some embodiments, the polymer backbone has a molecular weight of 500 to 200000.

In some embodiments, the hydrophilic polymer of the hydrophilic polymer having the terminal reactive group includes methoxypolyalkylene glycol.

In some embodiments, the terminal reactive group of the hydrophilic polymer having the terminal reactive group includes isocyanate group, carboxyl group, acyl halide group, or epoxy group.

In some embodiments, the hydrophilic polymer having the terminal reactive group has a weight average molecular weight of 500 to 20000.

In some embodiments, the protection group of the protection group modified histidine includes tert-butoxycarbonyl (Boc), carbobenzoxy (Cbz), fluorenylmethyloxycarbonyl (Fmoc), or acetyl group.

In some embodiments, the polymer backbone and the protection group modified histidine have a weight ratio of 100:0.05 to 100:350, and the polymer backbone and the hydrophilic polymer having the terminal reactive group have a weight ratio of 100:0.1 to 100:1050.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
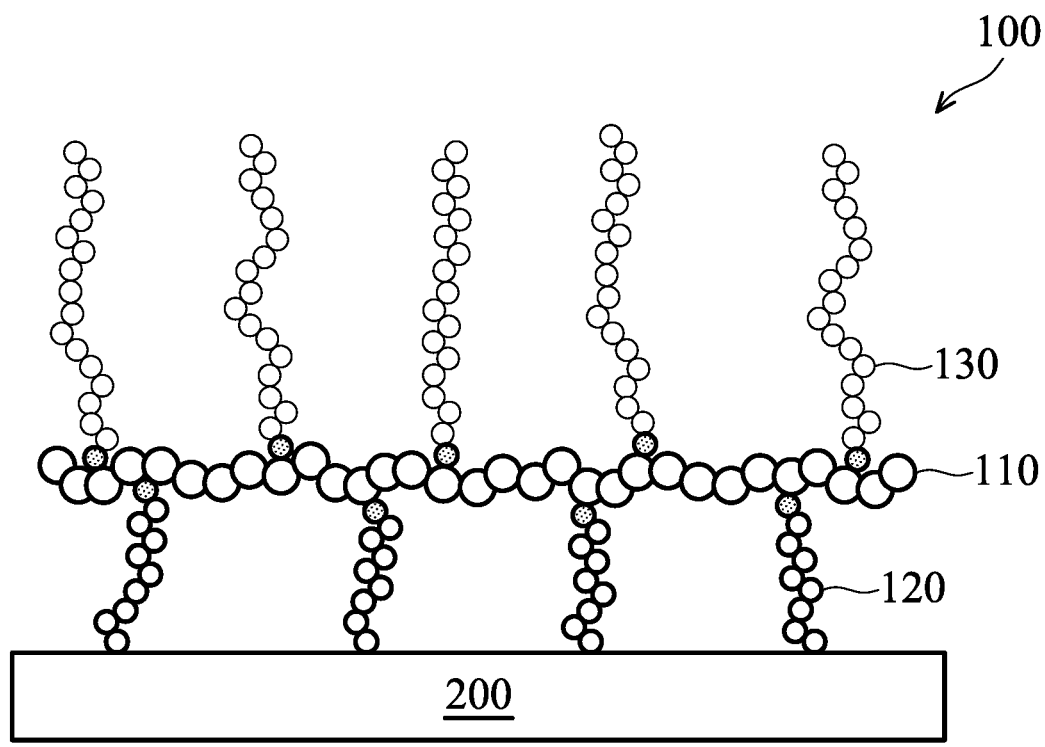
FIG. 1 shows a diagram of a composite material in one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

One embodiment of the disclosure provides a graft polymer, as shown in FIG. 1. In FIG. 1, the graft polymer 100 includes a polymer backbone 110. A protection group modified histidine 120 is grafted onto the side of the polymer backbone 110. A hydrophilic polymer having a terminal reactive group 130 is grafted onto the side of the polymer backbone 110. Because the side of the polymer backbone 110 originally includes a plurality of hydroxy groups, the protection group modified histidine 120 and the hydrophilic polymer having a terminal reactive group 130 may react with the hydroxy groups of the polymer backbone 110 to graft on the side of the polymer backbone 110.

It should be understood that the graft polymer 100 in FIG. 1 is only for illustration. For example, the protection group modified histidine 120 and the hydrophilic polymer having the terminal reactive group 130 can be alternately regular arranged, or irregularly arranged, and the protection group modified histidine 120 and the hydrophilic polymer having the terminal reactive group 130 may have a ratio of not 1:1.

In one embodiment, the polymer backbone 110 includes polyvinyl alcohol (PVA), polyalkylene glycol (PAG), polyvinyl acetate (PVAc), ethylene vinyl acetate copolymer (EVA), ethylene vinyl alcohol copolymer (EVOH), hyaluronic acid (HA), starch, cellulose, methyl cellulose (MC), hydroxypropyl methyl cellulose (HPMC), oxycellulose, glucan, scleroglucan polysaccharide, chitin, chitosan, curdlan gum, algin, carrageenan, pectin, arabic gum, guar gum, gellan gum, pullulan, chondroitin, heparin, or keratin sulfate.

In one embodiment, the polymer backbone 110 may have a weight average molecular weight of about 500 to 200000, such as (but be not limited to) about 500 to 5000, about 5000 to 10000, about 10000 to 30000, about 30000 to 50000, about 50000 to 80000, about 80000 to 100000, about 100000 to 150000, about 150000 to 200000, about 1000 to 180000, about 5000 to 150000, about 8000 to 120000, about 10000 to 160000, about 20000 to 120000, or about 30000 to 100000.

In one embodiment, the hydrophilic polymer of the hydrophilic polymer having the terminal reactive group 130 may include methoxypolyalkylene glycol, such as (but be not limited to) methoxypolyethylene glycol (mPEG), methoxypolypropylene glycol (mPPG), methoxypolybutylene glycol (mPBG), or another suitable methoxypolyalkylene glycol. In one embodiment, the reactive group of the hydrophilic polymer having the terminal reactive group 130 may include isocyanate group, carboxylic acid group, acyl halide group, or epoxy group. Take mPEG as an example, over equivalent of diisocyanate such as toluene diisocyanate (TDI), isophorone diisocyanate (IPDI), methylene diphenyl diisocyanate (MDI), methylene-bis(4-cyclohexylisocyanate (HMDI), lysine diisocyanate (LDI), or the like may react with mPEG, in which the terminal hydroxy group of mPEG is react with one isocyanate group of the diisocyanate, and another isocyanate group of the diisocyanate is kept at the terminal of the final product (e.g. terminal of hydrophilic polymer). On the other hand, the terminal hydroxy group of mPEG can be oxidized to form carboxylic acid group. The carboxylic acid group can react with thionyl halide (e.g. $SOCl_2$) to form acyl halide group. In addition, overly amount of halogenated epoxy compound (e.g. epichlorohydrin) can react with mPEG, in which the hydroxy group of mPEG and the halogen of the halogenated epoxy compound may carry out a substitution reaction, thereby keeping the epoxy group at terminal of the hydrophilic polymer. As such, the hydroxy groups of the polymer backbone 110 and the terminal reactive group of the hydrophilic polymer having the terminal reactive group 130 may react, thereby grafting the hydrophilic polymer having the terminal reactive group 130 to the side of the polymer backbone 110.

In one embodiment, the hydrophilic polymer having the terminal reactive group 130 have a weight average molecular weight of 500 to 20000, such as (but be not limited to) about 500 to 1000, about 1000 to 5000, about 5000 to 8000, about 8000 to 12000, about 12000 to 15000, about 15000 to 20000, about 800 to 15000, about 1200 to 12000, about 1500 to 15000, or about 2000 to 20000. If the molecular weight of the hydrophilic polymer having the terminal reactive group 130 is too low, the hydrophilicity of the hydrophilic polymer having the terminal reactive group 130 will be lowered to reduce the anti-adhesion effect. If the molecular weight of the hydrophilic polymer having the terminal reactive group 130 is too high, the hydrophilic polymer having the terminal reactive group 130 cannot easily graft to the polymer backbone 110 due to steric effect.

In one embodiment, the protection group of the protection group modified histidine 120 includes tert-butoxycarbonyl (Boc), carbobenzyloxy (Cbz), fluorenylmethoxycarbonyl (Fmoc), or acetyl group (Ac). For example, the protection group can be Boc. It's worth noting that if histidine (without protection group) is directly reacted with the polymer backbone 110, the amino group of one hisitidine may react with the carboxylic acid group of another histidine to form poly(histidine), thereby failing to form the graft polymer 100 in embodiments of the disclosure. In general, the hydroxy groups of the polymer backbone 110 and the carboxylic acid group of the protection group modified histidine 120 can be esterified to graft the protection group modified histidine 120 to the side of the polymer backbone 110.

In some embodiment, the polymer backbone 110 and the protection group modified histidine 120 have a weight ratio of 100:0.05 to 100:350, such as 100:1 to 100:300, 100:5 to 100:250, or 100:10 to 100:200. If the amount of protection group modified histidine 120 is too low, the graft polymer 100 cannot efficiently chelate to the metal material 200. If the amount of protection group modified histidine 120 is too high, the amount of hydrophilic polymer having the terminal reactive group 130 will be insufficient. On the other hand, the polymer backbone 110 and the hydrophilic polymer having the terminal reactive group 130 have a weight ratio of 100:0.1 to 100:1050, such as 100:5 to 100:1000, 100:20 to 100:800, or 100:50 to 100:500. If the amount of hydrophilic polymer having the terminal reactive group 130 is too low, the adhesion problem of the composite material after implantation into the organism as described below cannot be avoided. If the amount of hydrophilic polymer having the terminal reactive group 130 is too high, the amount of protection group modified histidine 120 will be insufficient.

One embodiment of the disclosure provides a composite material, as shown in FIG. 1. The composite material includes a metal material 200, and the graft polymer 100 coating the surface of the metal material 200. The protection group modified histidine 120 in the graft polymer 100 may chelate to the surface of the metal material 200. The Boc protection group modified histidine has a chemical structure as below:

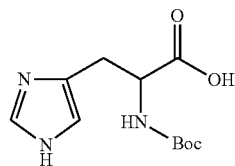 [SMILES: CC(C)(C)OC(=O)NC(Cc1c[nH]cn1)C(=O)O]

In the above structure, left imidazole of the Boc protection group modified histidine may chelate to the metal material 200. For example, the metal material 200 may include platinum, gold, iridium, palladium, or an alloy thereof. In one embodiment, the metal material 200 can be sheet-shaped, rod-shaped, block-shaped, tube-shaped, mesh-shaped, or another suitable shape depending on the application. Regardless of the configuration of the metal material 200, its surface is coated by the graft polymer 100.

In some embodiments, the composite materials can be used as tissue substitutes, catheters, vascular access devices, hemodialysis devices, vascular stents, biliary stents, or other supports. On the other hand, the composite materials can be implanted in living organisms (such as human or animal). For example, the composite material can be used as an electrode, which is connected to a wire, and the wire can be connected to a power-supply device such as an electrical stimulator, a cardiac rhythm device, an implantable cardiac defibrillator, a cochlear implant, or a continuous glucose monitoring system.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Example 1-1 (Preparation of Graft Polymer Product 1070326 PVABP)

First, Nα-(tert-butoxycarbonyl)-L-histidine (BocHis, 3.54 g, 13.8 mmol) and 4-dimethylamino pyridine (DMAP, 1.54 g, 12.5 mmol) were added to dimethylacetamide (DMAc, 28 mL). 1-Ethyl-3-(3-dimethylaminopropyl)carbodiimide (EDC, 2.41 g, 12.5 mmol) was then quickly added into the reaction bottle, and then reacted at 60° C. for 3 hours to activate BocHis. Polyvinyl alcohol (PVA, molecular weight=9000 to 10000, 2.2 g, 41.7 mmol, 80% hydrolysis) was added to DMAc (22 mL), and then stirred at 80° C. for 2 hours to be completely dissolved to form a PVA solution. The activated BocHis solution was quickly added to the PVA solution, and then continuously reacted at 90° C. for 24 hours to obtain a crude solution. The —COOH group of BocHis and the —OH group of PVA were esterified to graft BocHis to PVA. Subsequently, mono-methyl polyethylene glycol succinic acid (mPEG-SA, Mw=2000, 10 g, 5 mmol) was put into a two-neck bottle, DMAc (50 mL) was added and stirred at 50° C. to uniformly dissolve with mPEG-SA, and then cooled to 30° C. DMAP (0.513 g, 4.2 mmol) and EDC (0.805 g, 4.2 mmol) were sequentially added to the mPEG-SA solution, and then reacted at 60° C. for 3 hours to activate mPEG-SA. The activated mPEG-SA solution was added to BocHis grafted PVA, and the reacted crude solution was continuously reacted at 90° C. for 24 hours, in which the —COOH group of mPEG-SA and the —OH group of PVA were esterified to graft mPEG-SA to PVA. After the reaction, the crude solution was purified by tangential flow filtration (TFF, MWCO:10 k Da). The volume of the purified crude was increased by 18 to 20 times. Thereafter, the purified solution was condensed by rotator evaporator until being completely dried, thereby obtaining the graft polymer solid product 1070326 PVABP, which had a BocHis grafting ratio of 8% and an mPEG-SA grafting ratio of 5.5%, as determined by $^1$H-NMR.

Example 1-2 (Preparation of Graft Polymer Product 1070507 PVABP)

The preparation of 1070507 PVABP was similar to Example 1-1, and the differences in Example 1-2 were the BocHis amount being changed to 17.7 g (69.3 mmol), the DMAP amount being changed to 7.69 g (63 mmol), and the EDC amount being changed to 12.0 g (63 mmol). The mPEG-SA amount, the PVA amount, the reaction temperature and period, and the purification method of the crude solution in Example 1-2 were similar to those in Example 1-1, and the related description is not repeated here. The graft polymer solid product 1070507 PVABP had a BocHis grafting ratio of 25% and an mPEG-SA grafting ratio of 1.5%, as determined by $^1$H-NMR.

Example 1-3 (Preparation of Graft Polymer Product 1070521 PVABP)

The preparation of 1070521 PVABP was similar to Example 1-1, and the differences in Example 1-3 were BocHis amount and mPEG-SA amount. During the preparation of BocHis, the BocHis amount was changed to 10.6 g (41.6 mmol), the DMAP amount was changed to 4.6 g (37.8 mmol), and the EDC amount was changed to 7.2 g (37.8 mmol). During the preparation of mPEG-SA, the mPEG-SA amount was changed to 20 g (10 mmol), the DMAP amount was changed to 1.0 g (8.4 mmol), and the EDC amount was changed to 1.6 g (8.4 mmol). The PVA amount, the reaction temperature and period, and the purification method of the crude solution in Example 1-3 were similar to those in Example 1-1, and the related description is not repeated here. The graft polymer solid product 1070521 PVABP had a BocHis grafting ratio of 18% and an mPEG-SA grafting ratio of 1.0%, as determined by $^1$H-NMR.

Example 1-4 (Preparation of Graft Polymer Product 1070716 PVABP)

The preparation of 1070716 PVABP was similar to Example 1-3, and the difference in Example 1-4 was the grafting order. mPEG-SA was activated and grafted to PVA, and BocHis was then activated and grafted to PVA. The mPEG-SA amount, the Boc-His amount, the PVA amount, the reaction temperature and period, and the purification method of the crude solution in Example 1-4 were similar to those in Example 1-3, and the related description is not repeated here. The graft polymer solid product 1070716 PVABP had a BocHis grafting ratio of 29% and an mPEG-SA grafting ratio of 3.0%, as determined by $^1$H-NMR.

Example 1-5 (Preparation of Graft Polymer Product 1080114 PVABP)

The preparation of 1080114 PVABP was similar to Example 1-1, and the differences in Example 1-5 were the grafting order, the BocHis amount, and the mPEG-SA amount. mPEG-SA was activated and grafted to PVA, and BocHis was then activated and grafted to PVA. During the preparation of mPEG-SA, the mPEG-SA had molecular weight of 2100, the mPEG-SA amount was changed to 6.35 g (3.02 mmol), the DMAP amount was changed to 0.31 g (2.52 mmol), and the EDC amount was changed to 0.48 g (2.52 mmol). During the preparation of BocHis, the BocHis amount was changed to 10.6 g (41.6 mmol), the DMAP amount was changed to 4.6 g (37.8 mmol), and the EDC amount was changed to 7.2 g (37.8 mmol). The PVA amount, the reaction temperature and period, and the purification method of the crude solution in Example 1-5 were similar to those in Example 1-1, and the related description is not repeated here. The graft polymer solid product 1080114 PVABP had a BocHis grafting ratio of 28% and an mPEG-SA grafting ratio of 5%, as determined by $^1$H-NMR.

Example 1-6 (Preparation of Graft Polymer Product 1080121 PVABP)

The preparation of 1080121 PVABP was similar to Example 1-1, and the differences in Example 1-6 were the grafting order, the BocHis amount, the mPEG-SA amount, and the PVA amount. mPEG-SA was activated and grafted to PVA, and BocHis was then activated and grafted to PVA. During the preparation of mPEG-SA, the mPEG-SA had molecular weight of 2100, the mPEG-SA amount was changed to 6.93 g (3.3 mmol), the DMAP amount was changed to 0.34 g (2.75 mmol), and the EDC amount was changed to 0.53 g (2.75 mmol). During the preparation of BocHis, the BocHis amount was changed to 19.3 g (75.6 mmol), the DMAP amount was changed to 8.4 g (68.7 mmol), and the EDC amount was changed to 13.2 g (68.7 mmol). In addition, the PVA amount was changed to 4 g (76.3 mmol). The reaction temperature and period, and the purification method of the crude solution in Example 1-6 were similar to those in Example 1-1, and the related description is not repeated here. The graft polymer solid product 1080121 PVABP had a BocHis grafting ratio of 32% and an mPEG-SA grafting ratio of 3.5%, as determined by $^1$H-NMR.

Example 1-7 (Preparation of Graft Polymer Product 1080325 PVABP)

The preparation of 1080325 PVABP was similar to Example 1-1, and the differences in Example 1-7 were the grafting order, the BocHis amount, the mPEG-SA amount, and the PVA amount. mPEG-SA was activated and grafted to PVA, and BocHis was then activated and grafted to PVA. During the preparation of mPEG-SA, the mPEG-SA had molecular weight of 2100, the mPEG-SA amount was changed to 5.39 g (2.6 mmol), the DMAP amount was changed to 0.26 g (2.14 mmol), and the EDC amount was changed to 0.41 g (2.14 mmol). During the preparation of BocHis, the BocHis amount was changed to 7.72 g (30.2 mmol), the DMAP amount was changed to 3.36 g (27.5 mmol), and the EDC amount was changed to 5.27 g (27.5 mmol). In addition, the PVA amount was changed to 4 g (76.3 mmol). The reaction temperature and period, and the purification method of the crude solution in Example 1-7 were similar to those in Example 1-1, and the related description is not repeated here. The graft polymer solid product 1080325 PVABP had a BocHis grafting ratio of 18% and an mPEG-SA grafting ratio of 2.5%, as determined by $^1$H-NMR.

Example 1-8 (Preparation of Graft Polymer Product 1080422 PVABP)

The preparation of 1080422 PVABP was similar to Example 1-1, and the differences in Example 1-8 were the grafting order, the BocHis amount, the mPEG-SA amount, and the PVA amount. mPEG-SA was activated and grafted to PVA, and BocHis was then activated and grafted to PVA. During the preparation of mPEG-SA, the mPEG-SA had molecular weight of 2100, the mPEG-SA amount was changed to 6.93 g (3.3 mmol), the DMAP amount was changed to 0.34 g (2.75 mmol), and the EDC amount was changed to 0.53 g (2.75 mmol). During the preparation of BocHis, the BocHis amount was changed to 12.9 g (50.4 mmol), the DMAP amount was changed to 8.8 g (45.8 mmol), and the EDC amount was changed to 5.6 g (45.8 mmol). In addition, the PVA amount was changed to 4 g (76.3 mmol). The reaction temperature and period, and the purification method of the crude solution in Example 1-8 were similar to those in Example 1-1, and the related description is not repeated here. The graft polymer solid product 1080422 PVABP had a BocHis grafting ratio of 23% and an mPEG-SA grafting ratio of 2.8%, as determined by $^1$H-NMR.

Example 1-9 (Preparation of Graft Polymer Product 1080520 PVABP)

The preparation of 1080520 PVABP was similar to Example 1-8, and the differences in Example 1-9 was the BocHis being pretreated by vacuum drying before preparation. The vacuum drying was performed at room temperature (about 20° C. to 25° C.) for 10 minutes, and then purged by nitrogen. The graft polymer solid product 1080520

PVABP had a BocHis grafting ratio of 28% and an mPEG-SA grafting ratio of 3.5%, as determined by $^1$H-NMR.

Example 1-10 (Preparation of Graft Polymer Product 1081104 PVABP)

The preparation of 1081104 PVABP was similar to Example 1-1, and the differences in Example 1-10 were the grafting order, the BocHis amount, the mPEG-SA amount, and the PVA amount. mPEG-SA was activated and grafted to PVA, and BocHis was then activated and grafted to PVA. During the preparation of mPEG-SA, the mPEG-SA had molecular weight of 2100, the mPEG-SA amount was changed to 3.46 g (1.65 mmol), the DMAP amount was changed to 0.17 g (1.37 mmol), and the EDC amount was changed to 0.26 g (1.37 mmol). During the preparation of BocHis, the BocHis amount was changed to 13.9 g (54.6 mmol), the DMAP amount was changed to 6.06 g (49.6 mmol), and the EDC amount was changed to 9.51 g (49.6 mmol). In addition, the PVA amount was changed to 2 g (38.2 mmol). The reaction temperature and period, and the purification method of the crude solution in Example 1-10 were similar to those in Example 1-1, and the related description is not repeated here. The graft polymer solid product 1081104 PVABP had a BocHis grafting ratio of 62% and an mPEG-SA grafting ratio of 1%, as determined by $^1$H-NMR.

Example 1-11 (Preparation of Graft Polymer Product 1081118 PVABP)

The preparation of 1081118 PVABP was similar to Example 1-1, and the differences in Example 1-11 were the grafting order, the BocHis amount, the mPEG-SA amount, and the PVA amount. mPEG-SA was activated and grafted to PVA, and BocHis was then activated and grafted to PVA. During the preparation of mPEG-SA, the mPEG-SA had molecular weight of 650, the mPEG-SA amount was changed to 6.85 g (10.5 mmol), the DMAP amount was changed to 1.07 g (8.8 mmol), and the EDC amount was changed to 1.68 g (8.8 mmol). During the preparation of BocHis, the BocHis amount was changed to 6.43 g (25.2 mmol), the DMAP amount was changed to 2.8 g (22.9 mmol), and the EDC amount was changed to 4.4 g (22.9 mmol). In addition, the PVA amount was changed to 2 g (38.2 mmol). The reaction temperature and period, and the purification method of the crude solution in Example 1-11 were similar to those in Example 1-1, and the related description is not repeated here. The graft polymer solid product 1081118 PVABP had a BocHis grafting ratio of 5% and an mPEG-SA grafting ratio of 22%, as determined by $^1$H-NMR.

Example 2-1 (Test of the Adhesive Force of the Graft Polymer Product 1070521 PVABP)

The graft polymer product 1070521 PVABP provided in Example 1-3 was coated onto a platinum foil, and then immersed into phosphate buffer saline (PBS) for 24 hours. After air drying, the graft polymer coated platinum foil was tested by cross-cut method (test standard: ISO2409). The test result shows that the peeling area of the coating was only about 5% to 15%. According to the test, the graft polymer could be adsorbed to the surface of the platinum foil, and would not be peeled in a large amount or even completely peeled due to immersion in PBS.

Example 2-2 (Test of the Adhesive Force of the Graft Polymer Product 1070716 PVABP)

The graft polymer product 1070716 PVABP provided in Example 1-4 was coated onto a platinum foil, and then immersed into PBS for 24 hours. After air drying, the graft polymer coated platinum foil was tested by cross-cut method (test standard: ISO2409). The test result shows that no coating was peeled. According to the test, the graft polymer could be stably adsorbed to the surface of the platinum foil, and would not be peeled due to immersion in PBS.

Example 3 (Test of Inhibiting Protein Adhesion, Anti-Adhesion Test)

The graft polymer product 1070716 PVABP provided in Example 1-4 was coated onto a platinum foil, then immersed into a PBS solution containing 1% bovine serum albumin (BSA) for 24 hours, and then air dried. In addition, another platinum foil was immersed into a PBS solution containing 1% BSA for 24 hours, and then air dried. The vibration frequencies of the samples mentioned above were measured by quartz crystal microbalance (QCM·CHI 400 C commercially available from CH Instruments company, USA), respectively. The measured vibration frequencies of the samples were converted to the adsorption weights of the protein. For example, when the quartz crystal with a vibration frequency of 7.995 MHz was adopted, the vibration frequency would be decreased by 1 Hz if the protein adsorption weight was increased by 1.34 ng/0.196 cm$^2$. The test result is shown in Table 1, in which the platinum foil coated with the graft polymer product 1070716 PVABP had a protein adsorption amount of 40.76 ng/cm$^2$, and the Pt foil had a protein adsorption amount of 1450 ng/cm$^2$. Obviously, the graft polymer could effectively reduce the protein adsorption amount (anti-adhesion effect).

TABLE 1

| Sample | The protein adsorption amount after 24 hours (ng/cm$^2$) |
| --- | --- |
| 1070716 PVABP/Pt foil | 40.76 |
| Pt foil | 1450 |

Example 4 (Test of Inhibiting Cell Adhesion, Anti-Adhesion Test)

The graft polymer product 1070716 PVABP provided in Example 1-4 was coated onto a platinum foil with an area of 1×1 cm$^2$, and then put into a culture plate of 12 wells. 200 µL of human skin fibroblasts solution (HSF, about 5×10$^5$ cells/mL) was uniformly seeded to the surface of sample (the above-mentioned graft polymer-coated platinum foil), thereby achieving a cell density of 1×10$^5$ cells/sample. After the cells were adsorbed on the sample, 1.5 mL of cell culture medium (90% DMEM and 10% Fetal bovine serum) was added to each of the wells. The culture plate was moved into a cell incubator (SCA-165D commercially available from Astec. Co., Ltd.) at 37° C. to incubate for 1 to 4 days. Thereafter, 1 mL of neutral red solution (N2889 commercially available from Sigma) was added to each of the wells and the culture plate was moved into the cell incubator (SCA-165D) to incubate for 0.5 to 1 hour. After staining the nuclei of the live cells, the neutral red solution was removed. Then, the cells adhered in the samples were taken out by collagenase/trypsin enzyme solution, and 200 µL of the enzyme solution dissolving the cells was put into a microplate of 96 wells. The Ex/Em 535/615 fluorescent value of the solution was measured by ELISA reader to calculate the cell amount included in the sample.

The above steps were repeated, and the difference was the sample being a platinum foil without coating the graft polymer. If the HSF cell adsorption amount of platinum foil was set as 100%, the HSF cell adsorption amount of 1070716 PVABP/Pt foil was lower than 10%. Obviously, the graft polymer provided in Examples of the disclosure could efficiently lower the HSF cell adsorption amount (anti-adhesion effect).

Example 5 (Electrical Impedance Test)

A platinum foil was immersed in a PBS solution containing 1% BSA to measure its electrical impedance (about 10Ω). The graft polymer product 1070716 PVABP provided in Example 1-4 was coated onto a platinum foil, and the structure was immersed in a PBS solution containing 1% BSA to measure its electrical impedance (about 50Ω). In general, the material having electrical impedance lower than or equal to 100Ω could be function as an electrode. As such, the graft polymer provided in Examples of the disclosure may be applied to the electrode.

Example 6-1 (Resistance Change Test of Platinum Foil in Phantom)

A platinum foil was immersed in a PBS solution containing 1% BSA to measure its resistance (13.8Ω). The platinum foil was immersed in a PBS solution containing 1% BSA for 14 days to measure its resistance (25.9Ω), and the resistance increased about 87%. The resistance increase should be resulted from the BSA adsorption on the platinum foil (so-called adhesion).

Example 6-2 (Resistance Change Test of Platinum Foil Coated with the Graft Polymer Product in Phantom)

The graft polymer product 1070716 PVABP provided in Example 1-4 was coated onto a platinum foil. The structure was immersed in a PBS solution containing 1% BSA to measure its resistance (11.6Ω). The structure was immersed in a PBS solution containing 1% BSA for 14 days to measure its resistance (13.9Ω), and the resistance only increased about 19.8%. Compared with Example 6-1, the platinum foil coated with the graft polymer had a significantly lower resistance increase ratio, showing that the graft polymer can greatly mitigate the adhesion issues.

Example 7-1 (Adhesion Test of the Graft Polymer Prepared by the Method Disclosed in U.S. Pat. No. 8,198,364)

Figure 2:
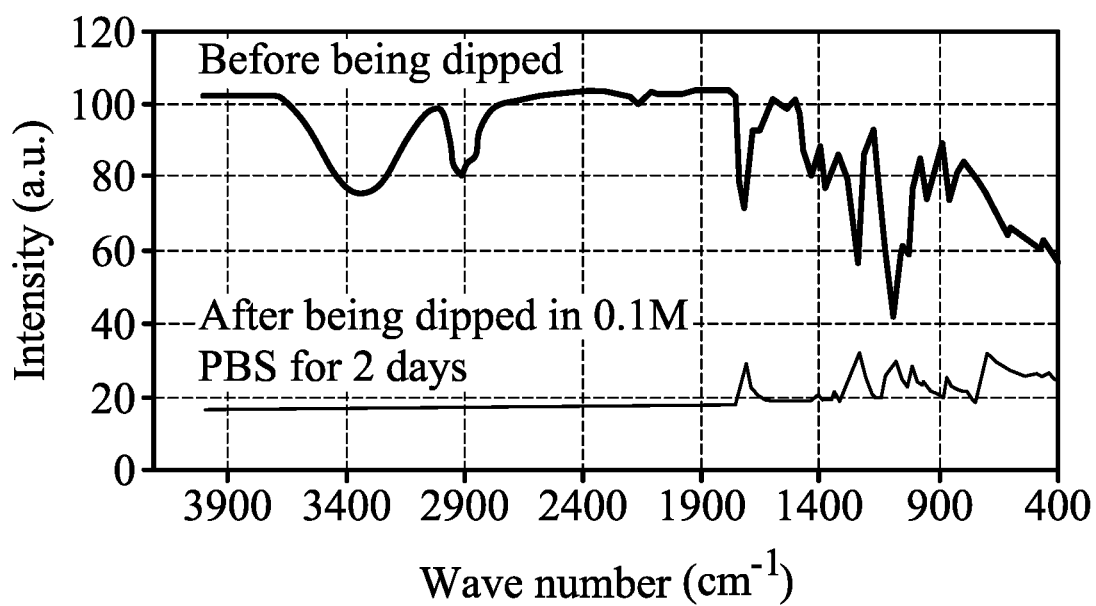
FIG. 2 shows IR spectra of a composite material before and after being immersed in a PBS solution in one embodiment of the disclosure.

According to the method disclosed in U.S. Pat. No. 8,198,364, PEG was grafted onto PVA to form a graft polymer. Then, the graft polymer was coated onto a platinum foil (referred as sample X) and infrared spectroscopy (IR) spectrum of the sample X was measured by attenuated total reflection (ATR) infrared spectrometer. The result is shown in FIG. 2. The mentioned sample X was then immersed in a 0.1 M PBS solution for 2 days, and the IR spectrum of the sample X was measured as shown in FIG. 2. As known from the comparison in FIG. 2, the signal of the graft polymer prepared by U.S. Pat. No. 8,198,364 could not be measured after being immersed. Obviously, the graft polymer prepared by PEG grafted onto PVA had poor adhesion to the platinum foil.

Example 7-2 (Adhesion Test of the Graft Polymer Prepared by Examples of the Disclosure)

Figure 3A:
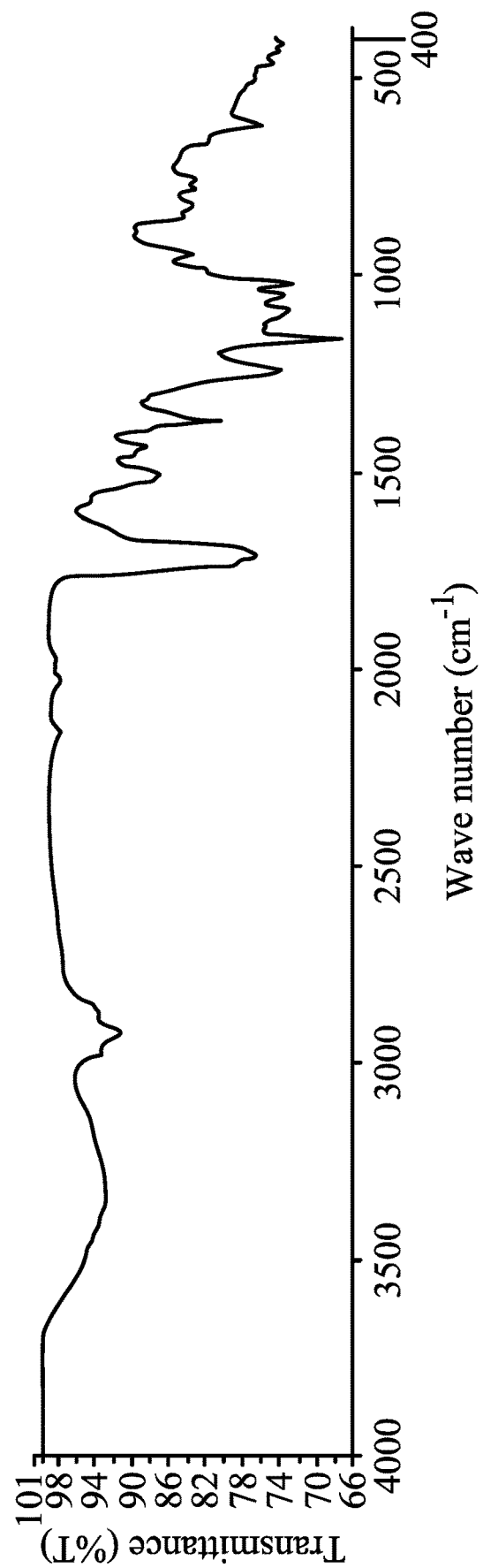
FIGS. 3A, 3B, 3C, and 3D are IR spectra of composite materials before and after being immersed in a PBS solution in one embodiment of the disclosure.
Figure 3B:
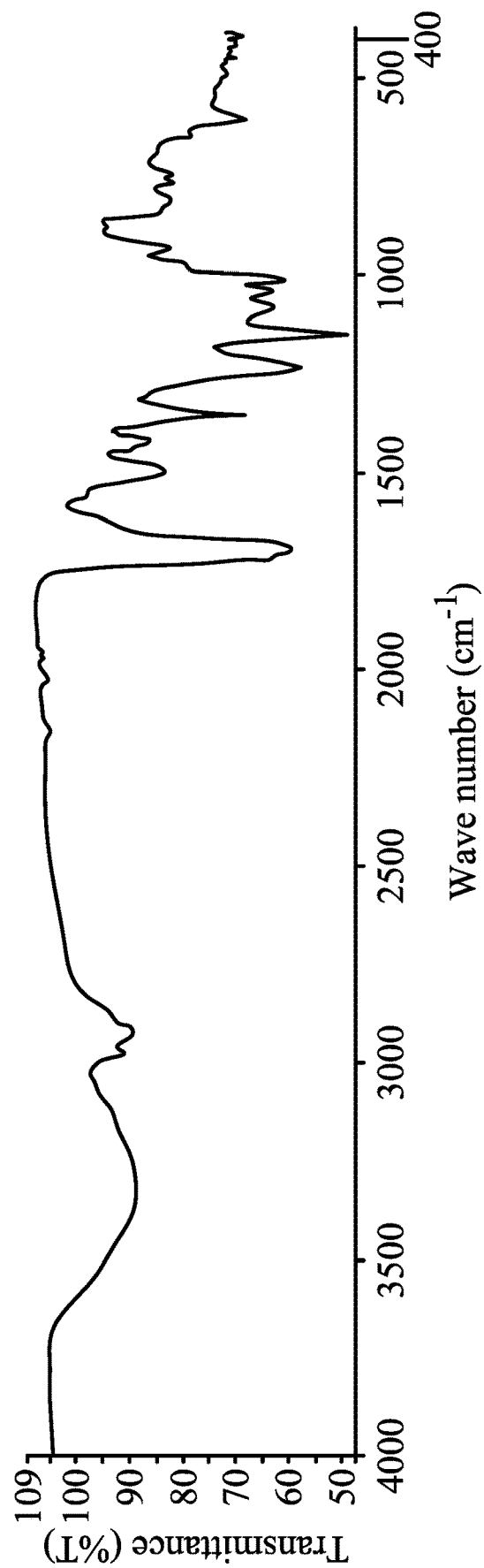
Figure 3C:
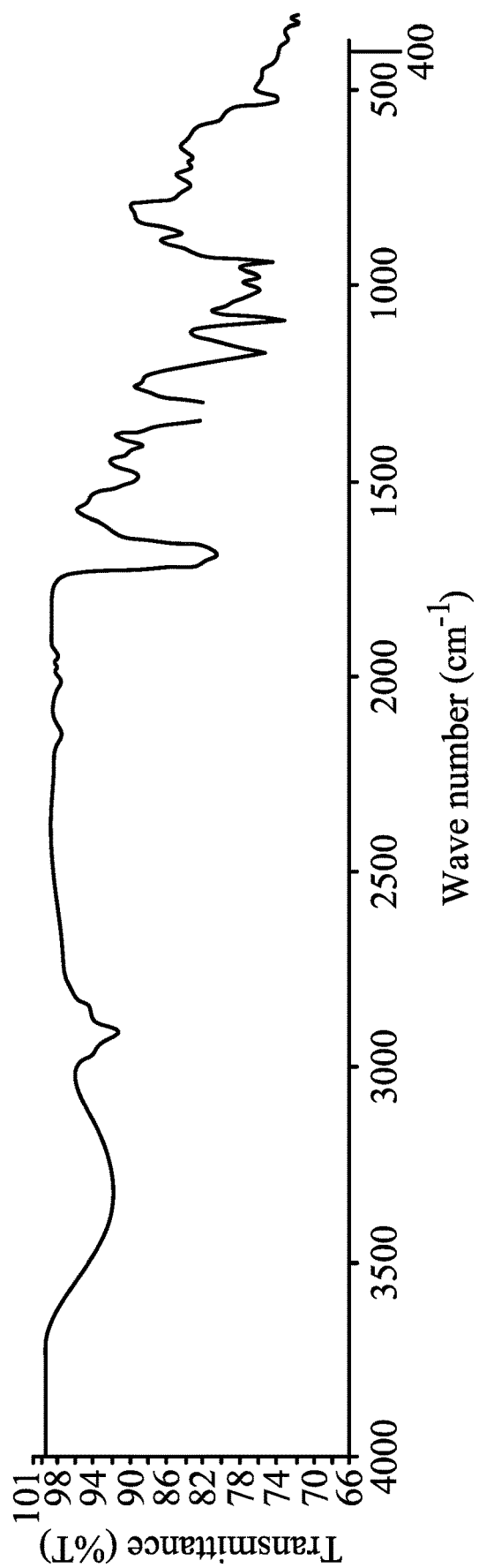
Figure 3D:
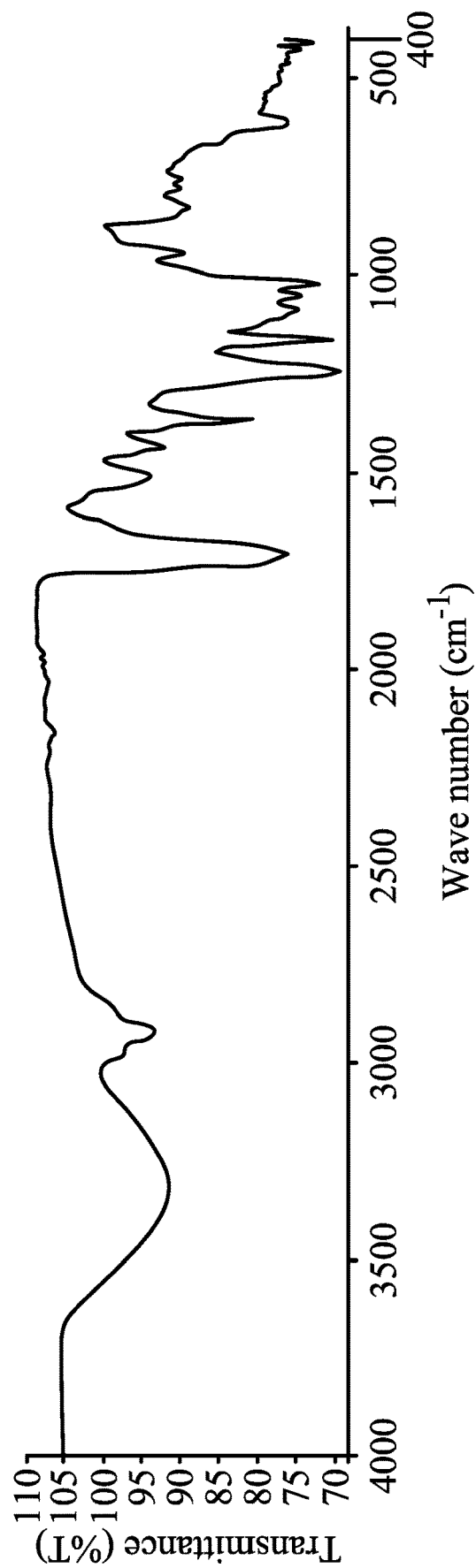

The graft polymer product 1080114 PVABP provided in Example 1-5 was coated onto a platinum foil (referred as sample 1-5), and the graft polymer product 1080325 PVABP provided in Example 1-7 was coated onto another platinum foil (referred as sample 1-7). Then, IR spectra of samples 1-5 and 1-7 were measured by attenuated total reflection (ATR) infrared spectrometer. The results are shown in FIG. 3A (sample 1-5, Example 1-5) and FIG. 3C (sample 1-7, Example 1-7). The samples 1-5 and 1-7 were then immersed in a 0.1 M PBS solution for 60 days, and the IR spectra of the samples 1-5 and 1-7 were measured as shown in FIG. 3B (sample 1-5, Example 1-5) and FIG. 3D (sample 1-7, Example 1-7). As known from the comparison between FIGS. 3A and 3B and the comparison between FIGS. 3C and 3D, the IR spectra of the graft polymer prepared by Examples of the disclosure after being immersed for a long time were similar to that before immersing. Obviously, the graft polymer provided in Examples of the disclosure has excellent adhesion to the platinum foil.

Example 8 (Test of Anti-Protein Adsorption of the Graft Polymer Prepared by Example of the Disclosure)

The graft polymer product 1070326 PVABP provided in Example 1-1 was coated onto a platinum foil, and the graft polymer product 1070521 PVABP provided in Example 1-3 was coated onto another platinum foil. The above structures were immersed into two separate protein solutions (50% FBS), respectively, to measure the protein adsorption amounts thereof. Simultaneously, a Pt foil is immersed into a protein solution (50% FBS) to measure the protein adsorption amount thereof. The protein adsorption amounts of the structures are measured by the Lowry protein assay method. The protein adsorption amount of Pt foil was set as 100%, the protein adsorption amount of 1070326 PVABP/Pt foil structure was 61.14%, and the protein adsorption amount of 1070521 PVABP/Pt foil structure was 51.57%. Accordingly, the graft polymer provided by in Examples of the disclosure could effectively reduce the protein adsorption amount, (anti-protein adhesion effect).

Example 9 (Toxicity Test of the Graft Polymer Prepared by the Disclosure)

A platinum foil was coated on a PET substrate as a control experiment. A platinum foil was coated onto a PET substrate, and the graft polymer product 1070716 PVABP provided in Example 1-4 was coated onto the platinum foil, such that the platinum foil was disposed between the PET and the 1070716 PVABP coating. Then, the toxicity test (agar toxicity) of the two structures was performed by referring the procedure of ASTM F895-84 (2006) and the standard testing method of ISO10993-5:2009. According to the test results, no cells were affected and died inside and outside the sample placement area, indicating that the graft polymer provided in Example of the disclosure was not cytotoxic.

Comparative Example 1 (Stability Test of the Graft Polymer Provided in Example of the Disclosure and Another Graft Polymer that was Grafted with Another Amino Acid)

Preparation of PVAPP Graft Polymer

First, Nα-(tert-butoxycarbonyl)-L-phenylalanine (BocPhe, 13.4 g, 50.4 mmol) and DMAP (5.6 g, 45.8 mmol) were added to DMAc (101 mL). EDC (8.8 g, 45.8 mmol) was then quickly added into the reaction bottle, and then reacted at 60° C. for 3 hours to activate BocPhe. PVA (Mw=9000 to 10000, 4 g, 76.3 mmol, 80% hydrolysis) was added to DMAc (40 mL), and then stirred at 80° C. for 2 hours to be completely dissolved to form a PVA solution. The activated BocHis solution was quickly added to the PVA solution, and then continuously reacted at 90° C. for 24 hours to obtain a crude solution. The —COOH group of BocPhe and the —OH group of PVA were esterified to graft BocPhe to PVA. Subsequently, mPEG-SA (Mw=2100, 6.93 g, 3.3 mmol) was put into a two-neck bottle, DMAc (33 mL) was added and stirred at 50° C. to uniformly dissolve mPEG-SA, and then cooled to 30° C. DMAP (0.34 g, 2.75 mmol) and EDC (0.53 g, 2.75 mmol) were sequentially added to the mPEG-SA solution, and then reacted at 60° C. for 3 hours to activate mPEG-SA. The activated mPEG-SA solution was added to BocPhe grafted PVA, and the reacted crude solution was continuously reacted at 90° C. for 24 hours, in which the —COOH group of mPEG-SA and the —OH group of PVA were esterified to graft mPEG-SA to PVA. After the reaction, the crude solution was purified by TFF (MWCO: 10 k Da). The volume of the purified crude was increased by 18 to 20 times. Thereafter, the purified solution was condensed by rotator evaporator until being completely dried, thereby obtaining the graft polymer solid product PVAPP, which had a BocPhe grafting ratio of 10% and an mPEG-SA grafting ratio of 3%, as determined by $^1$H-NMR.

Figure 4A:
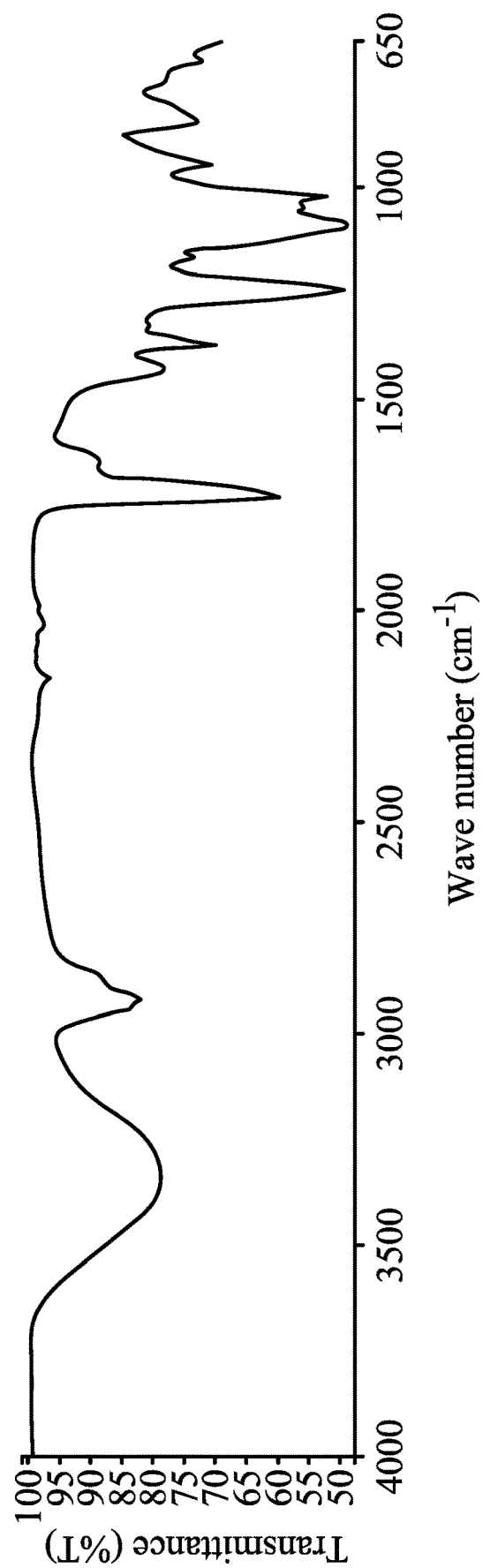
FIGS. 4A, 4B, and 4C are IR spectra of a composite material before and after being immersed in a PBS solution in one embodiment of the disclosure.
Figure 4B:
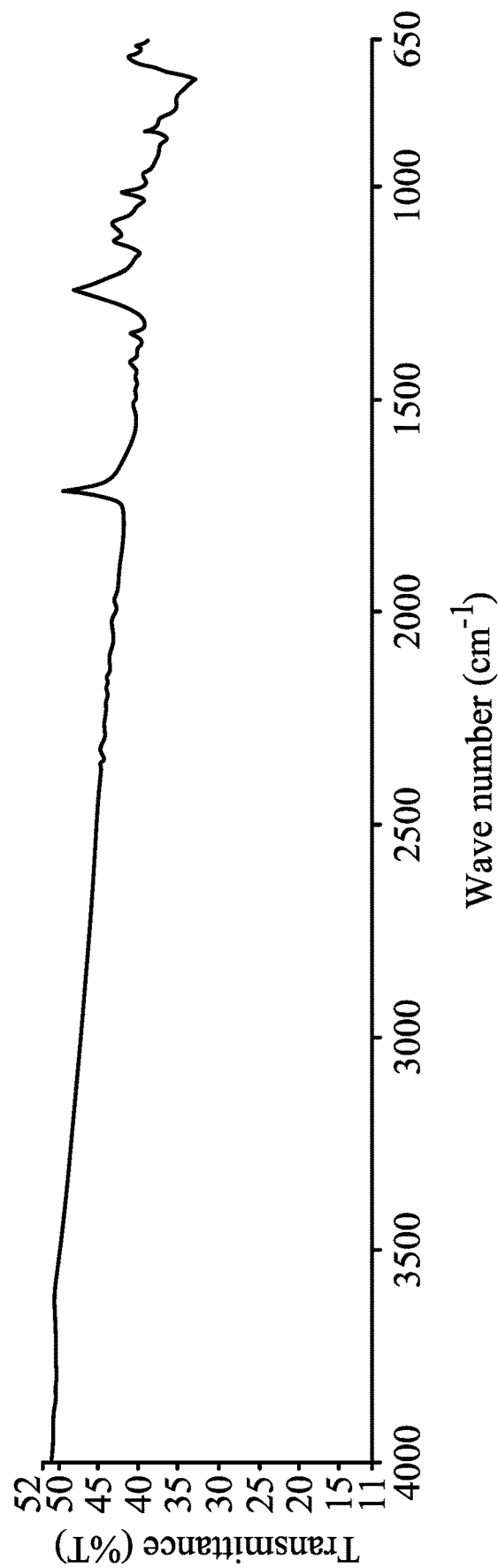
Figure 4C:
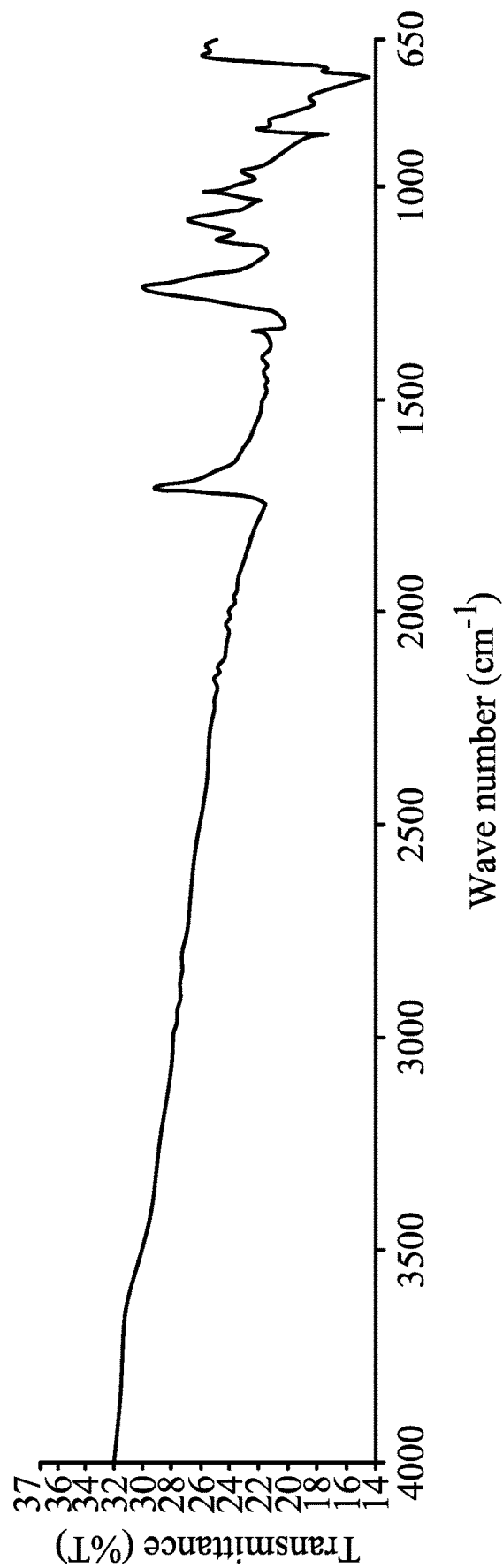

The graft polymer product PVAPP was coated onto a platinum foil (referred as sample Y), and IR spectrum of the sample Y was measured by attenuated total reflection (ATR) infrared spectrometer. The result is shown in FIG. 4A. The sample Y was immersed in a 0.1 M PBS solution for 1 day to measure its IR spectrum (FIG. 4B) and 2 days to measure its IR spectrum (FIG. 4C). No material signal could be measured after being immersed in the PBS solution for 1 day. Compared with the graft polymer PVAPP, the IR spectra of the graft polymer PVABP demonstrated in Example 7-2 after being immersed in the PBS solution for a long time was similar to that before immersing. As such, the graft polymer PVABP provided by this disclosure coated on the platinum foil was more stable than the graft polymer PVAPP coated on the platinum foil. As known from Comparative Example 1, the graft polymer formed from the amino acid (e.g. phenylalanine) other than histidine is not suitable to coat the electrode.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A composite material, comprising:
   a metal material; and
   a graft polymer coated on the metal material, wherein the graft polymer includes:
   a polymer backbone with a plurality of hydroxy groups;
   a protection group modified histidine grafted onto the side of the polymer backbone; and
   a hydrophilic polymer having a terminal reactive group grafted onto the side of the polymer backbone,
   wherein the graft polymer is adsorbed to the surface of the metal material by the protection group modified histidine.

2. The composite material as claimed in claim 1, wherein the metal material includes platinum, gold, iridium, palladium, or an alloy thereof.

3. The composite material as claimed in claim 1, wherein the polymer backbone comprises polyvinyl alcohol (PVA), polyalkylene glycol (PAG), polyvinyl acetate (PVAc), ethylene vinyl acetate copolymer (EVA), ethylene vinyl alcohol copolymer (EVOH), hyaluronic acid (HA), starch, cellulose, methyl cellulose (MC), hydroxypropyl methyl cellulose (HPMC), oxycellulose, glucan, scleroglucan polysaccharide, chitin, chitosan, curdlan gum, algin, carrageenan, pectin, arabic gum, guar gum, gellan gum, pullulan, chondroitin, heparin, or keratin sulfate.

4. The composite material as claimed in claim 1, wherein the polymer backbone has a molecular weight of 500 to 200000.

5. The composite material as claimed in claim 1, wherein the hydrophilic polymer of the hydrophilic polymer having the terminal reactive group includes methoxypolyalkylene glycol.

6. The composite material as claimed in claim 1, wherein the terminal reactive group of the hydrophilic polymer having the terminal reactive group includes isocyanate group, carboxyl group, acyl halide group, or epoxy group.

7. The composite material as claimed in claim 1, wherein the hydrophilic polymer having the terminal reactive group has a weight average molecular weight of 500 to 20000.

8. The composite material as claimed in claim 1, wherein the protection group of the protection group modified histidine comprises tert-butoxycarbonyl (Boc), carbobenzoxy (Cbz), fluorenylmethyloxycarbonyl (Fmoc), or acetyl group.

9. The composite material as claimed in claim 1, wherein the polymer backbone and the protection group modified histidine have a weight ratio of 100:0.05 to 100:350, and the polymer backbone and the hydrophilic polymer having the terminal reactive group have a weight ratio of 100:0.1 to 100:1050.

* * * * *